(12) United States Patent
Yoon (10) Patent No.: US 6,325,556 B1
(45) Date of Patent: Dec. 4, 2001

(54) SUPPORT DEVICE OF PORTABLE PHOTOGRAPHING APPARATUS

(75) Inventor: Hee-Joung Yoon, Suwon (KR)

(73) Assignee: Samsung Electronics., Ltd., Suwon (KR)

( * ) Notice: Subject to any disclaimer, the term of this patent is extended or adjusted under 35 U.S.C. 154(b) by 0 days.

(21) Appl. No.: 09/489,923

(22) Filed: Jan. 24, 2000

(30) Foreign Application Priority Data

Feb. 5, 1999 (KR) .................................................. 99-3954

(51) Int. Cl.$^7$ ..................................................... G03B 17/00
(52) U.S. Cl. ........................ 396/419; 396/535; 352/243; 248/685
(58) Field of Search ..................................... 248/685, 686, 248/125.8, 371, 163.1, 440, 188.5; 396/419, 428, 535, 541, 424, 6; D16/244, 242; 352/243, 242; 353/119

(56) References Cited

U.S. PATENT DOCUMENTS

| | | | |
|---|---|---|---|
| 1,444,569 | * 2/1923 | Starkweather | 248/188 |
| 2,229,473 | * 1/1941 | Redmer | 248/188.5 |
| 2,744,712 | * 5/1956 | Brandt | 248/451 |
| 3,148,583 | * 9/1964 | Maiershofer | 353/119 |
| 4,751,540 | * 6/1988 | Jones | 396/419 |
| 5,384,609 | * 1/1995 | Ogawa et al. | 396/419 |
| 5,708,890 | * 1/1998 | Nakano | 396/428 |

* cited by examiner

*Primary Examiner*—Russell Adams
*Assistant Examiner*—Kenneth J Whittington
(74) *Attorney, Agent, or Firm*—Robert E. Bushnell, Esq.

(57) ABSTRACT

A support device of a portable photographing apparatus includes a plurality of support bodies coupled to the photographing apparatus to be capable of protruding and being inserted with respect to a bottom surface of the photographing apparatus, and a plurality of legs hinge-coupled to the support bodies to be capable of moving through cavities in the photographing apparatus enabling the hinge coupling and the plurality of legs to protrude or extend from a bottom surface of the photographic apparatus. The legs and the hinge coupling may also be inserted into these cavities together with the support bodies. During extension, the support bodies can rotate 360 degrees while the hinge coupling can cause the legs to be inclined with respect to the bottom surface of the photographing apparatus.

32 Claims, 7 Drawing Sheets

SUPPORT DEVICE OF PORTABLE PHOTOGRAPHING APPARATUS

CLAIM OF PRIORITY

This application makes reference to, incorporates the same herein, and claims all benefits accruing under 35 U.S.C. §119 from my application Support Device of Portahle Photographing Apparatus filed with the Korean Industrial Property Office on Feb. 5,1999 and there duly assigned Ser. No. 3954/1999.

FIELD OF THE INVENTION

The present invention relates to a device for supporting a portable photographing apparatus placed on a certain support surface.

DESCRIPTION OF THE RELATED ART

When pictures are taken using an apparatus for taking photographs or moving pictures, such as cameras or Camcorders, a user usually takes pictures while holding the photographing apparatus. However, there are many cases in which, to take pictures, the photographing apparatus needs to be placed on a certain support surface such as a floor or on top a fixed object. In this case, an additional support device such as a tripod is conventionally used.

However, when the tripod is used, it must be assembled to a photographing apparatus or disassembled therefrom to take pictures while being placed on a certain support surface or held by hands. As such assembly or disassembly is inconvenient and takes much time, it is a disadvantage in that quick photography is not available. Also, as the tripod disassembled from the photographing apparatus must be brought or carried separately from the photographing apparatus, it is inconvenient and, further, there is a possibility of losing it. When the photographing apparatus is kept, the tripod is usually kept separately. Thus, a user may forget to carry the tripod for taking pictures so that the user may be inconvenienced when the photographing apparatus needs to be placed on a certain support surface.

SUMMARY OF THE INVENTION

To solve the above problems, it is an objective of the present invention to provide a support device of a portable photographing apparatus having an improved structure which facilitates support of a photographing apparatus on a certain support surface.

Accordingly, to achieve the above objective, there is provided a support device of a portable photographing apparatus for supporting the portable photographing apparatus on an arbitrary support surface, which includes a plurality of support bodies coupled to the photographing apparatus to be capable of moving within cavities in a bottom surface of the photographing apparatus, and a plurality of legs having contact portions contacting the support surface at lower end portions thereof and having upper end portions hinge-coupled to the support bodies to be moved together with the support body, the hinge coupling and the legs capable of being extended from the bottom surface of the photographic apparatus during extension during use of the photographic apparatus and the legs and the hinge-coupling being capable of being retracted within the cavities after use. The support bodies allow the legs to rotate 360 degrees while the hinge coupling allow the legs to be inclined with respect to the bottom surface of the photographic apparatus during extension, allowing the photographic apparatus to be positioned on an uneven surface and function properly as a photographic apparatus.

BRIEF DESCRIPTION OF THE DRAWINGS

A more complete appreciation of the invention, and many of the attendant advantages, thereof will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
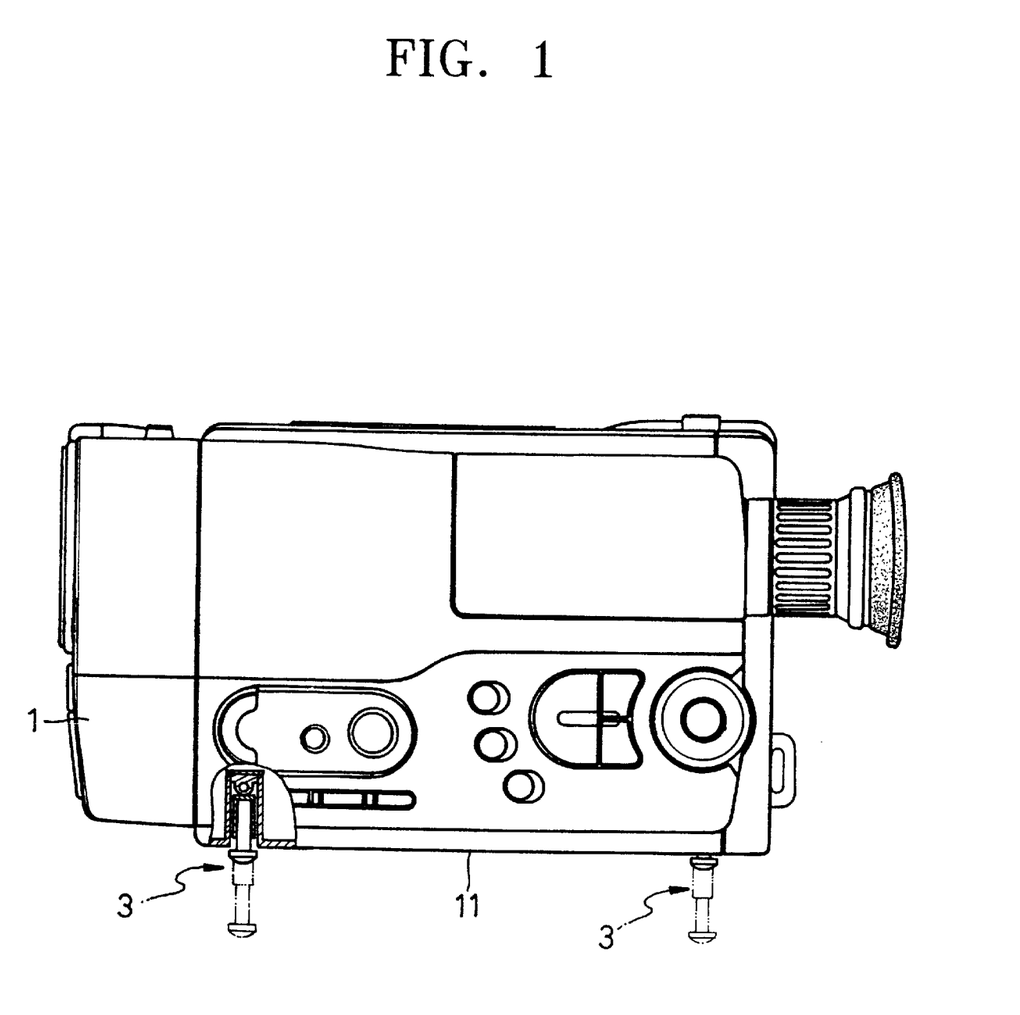
FIG. 1 is a side view showing a portable photographing apparatus adopting a support device according to a preferred embodiment of the present invention.
Figure 2:
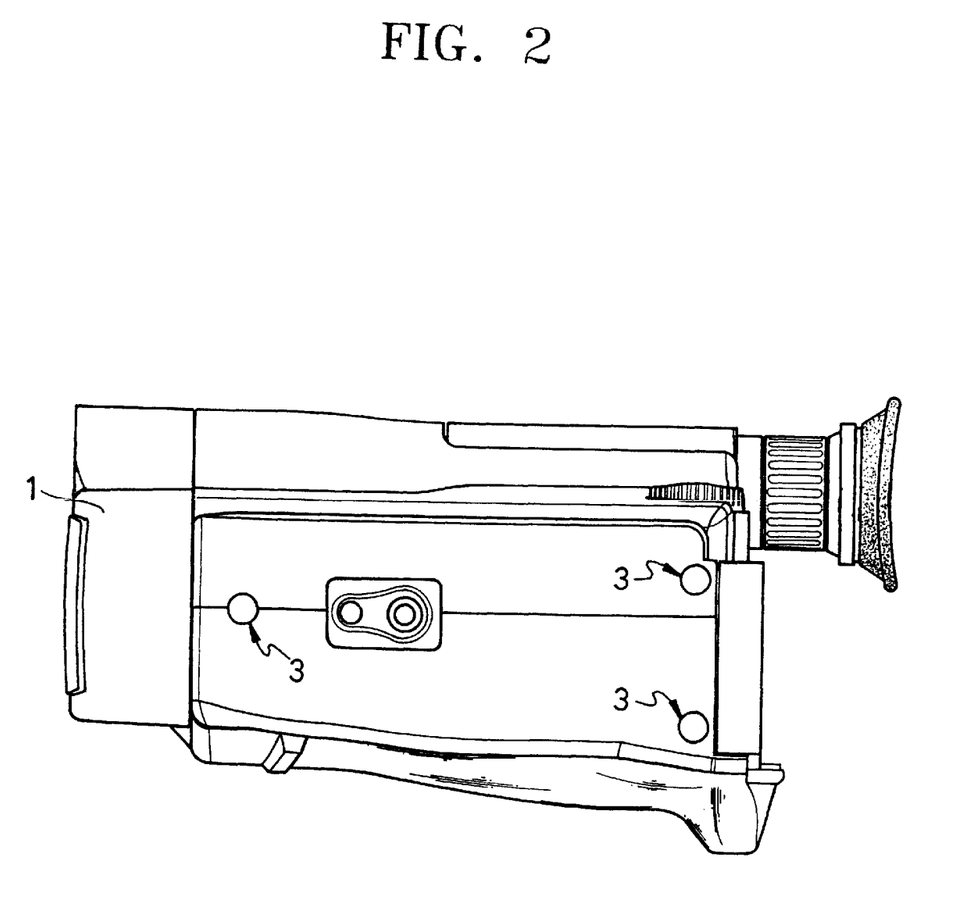
FIG. 2 is a bottom view of the photographing apparatus shown in FIG. 1

As shown in FIG. 1, a support device of a preferred embodiment of the present invention includes leg assemblies 3 which are capable of moving in directions in which the leg assemblies 3 protrude and inserted with respect to a bottom surface 11 of a photographing apparatus 1. The leg assemblies 3 are preferably arranged at three locations, as shown in FIG. 2. The leg assemblies 3, as shown in FIGS. 3 and 4, include a support body 20 installed in a first cavity 13 having walls in the shape of a pipe type boss 12 provided at a bottom portion of the photographing apparatus 1 and a leg 30 coupled to the support body 20 via coupling pin 25.

Figure 3:
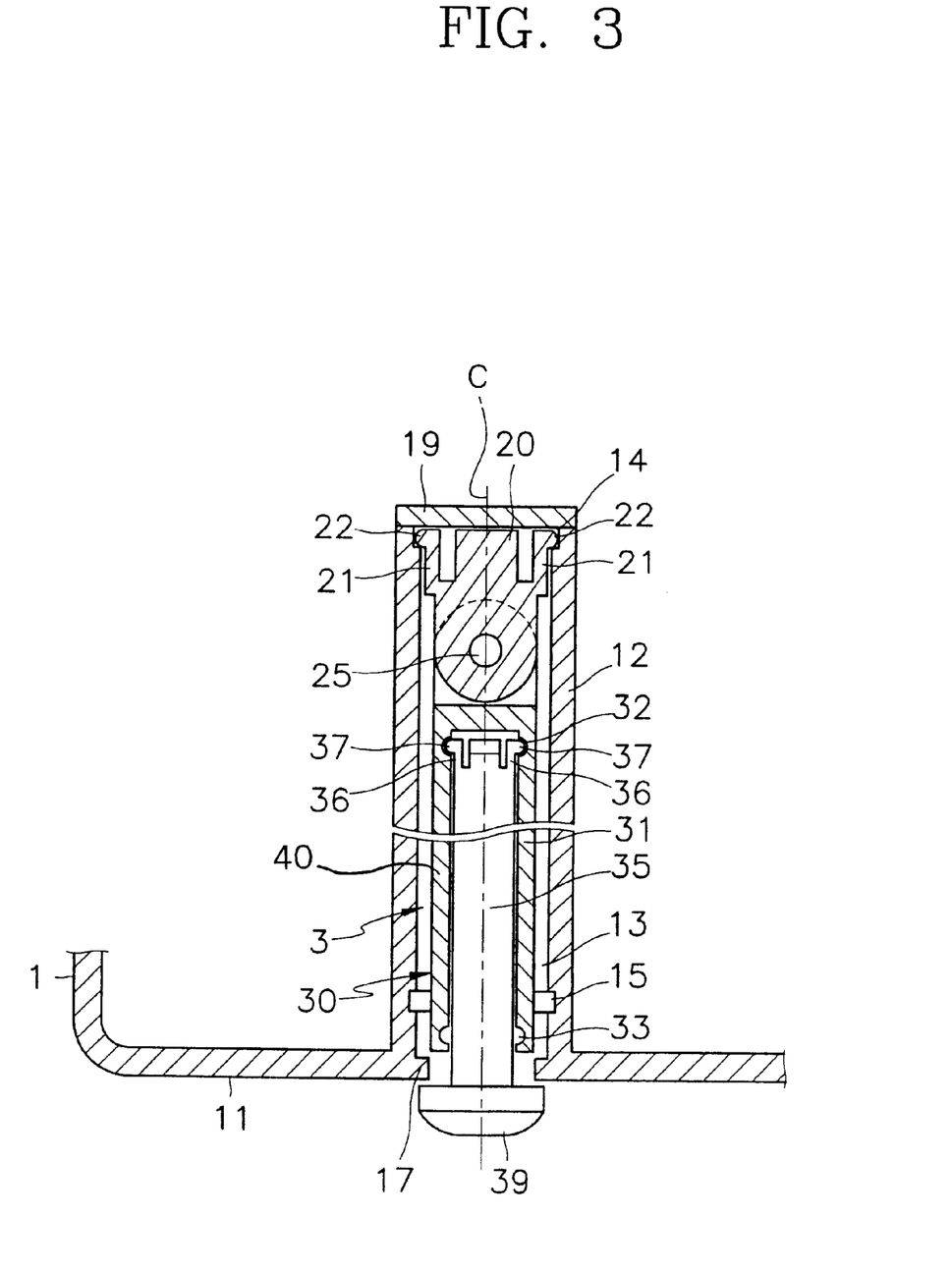
FIG. 3 is an enlarged sectional view of a leg assembly shown in FIG. 1 in an inserted or retracted state.
Figure 4:
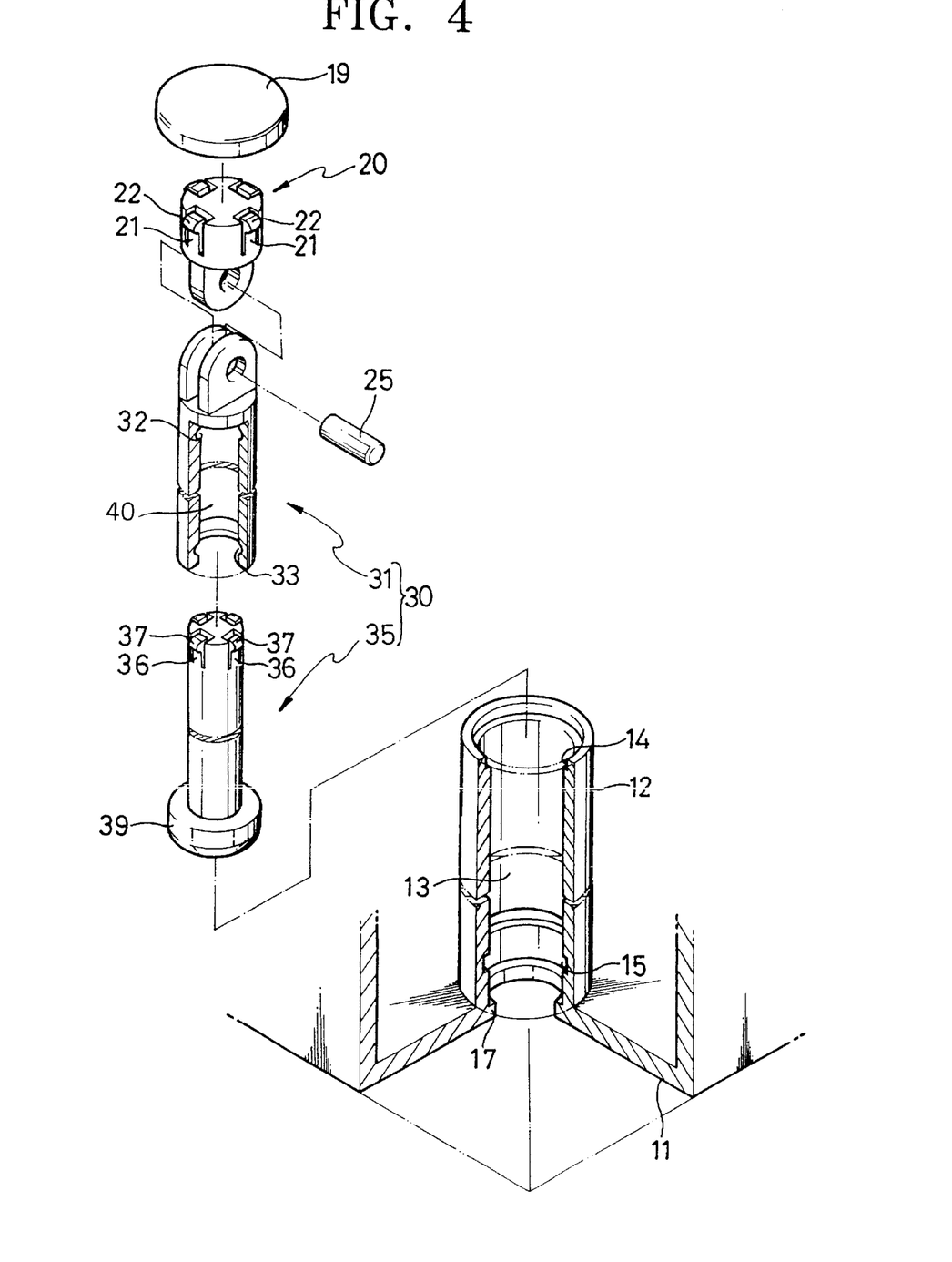
FIG. 4 is an exploded perspective view of the leg assembly shown in FIG. 3.
Figure 5:
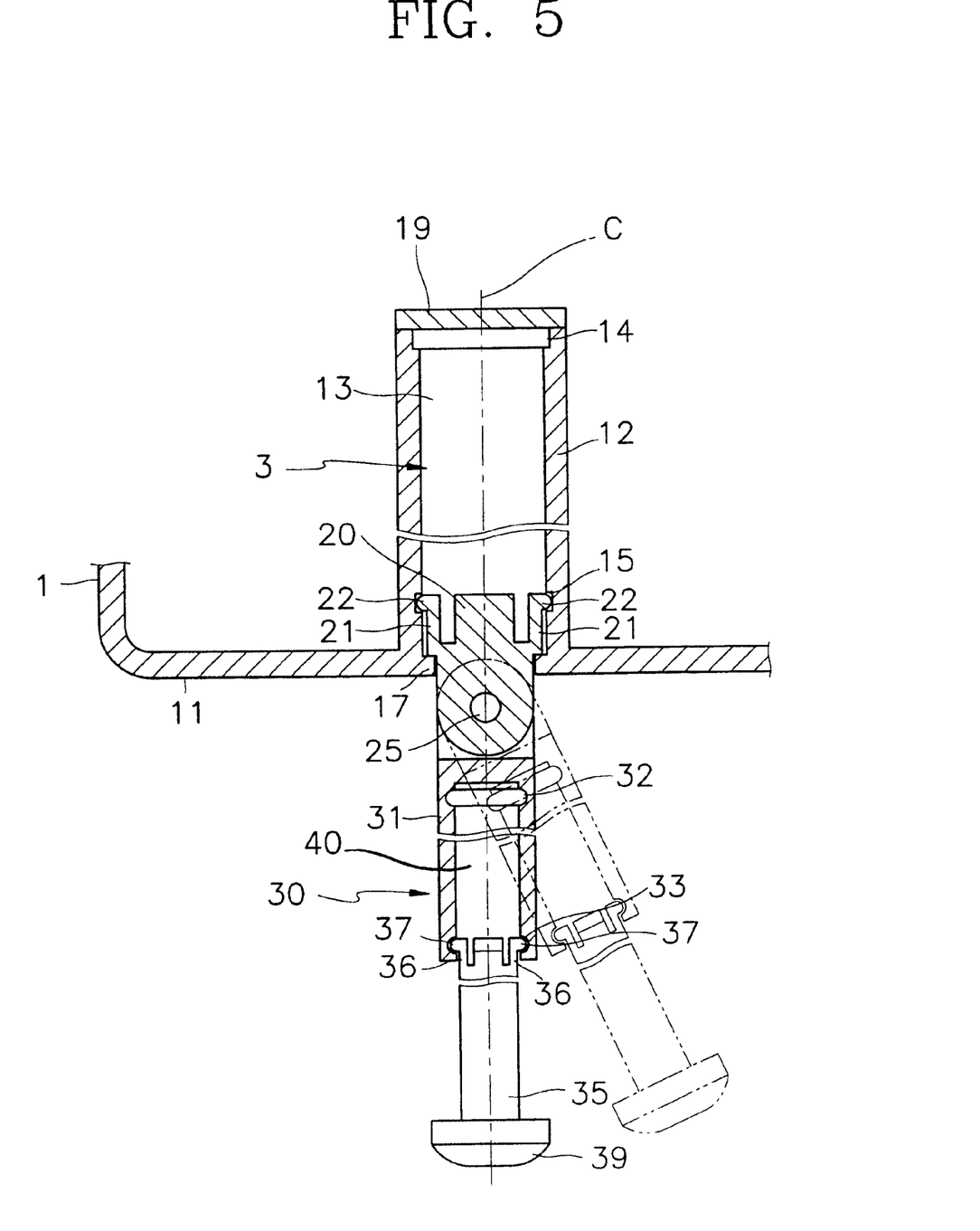
FIG. 5 is a sectional view showing a state in which a leg and hinge coupling and legs protrude from the photographic apparatus in an extended state for use of the photographic apparatus.
Figure 6:
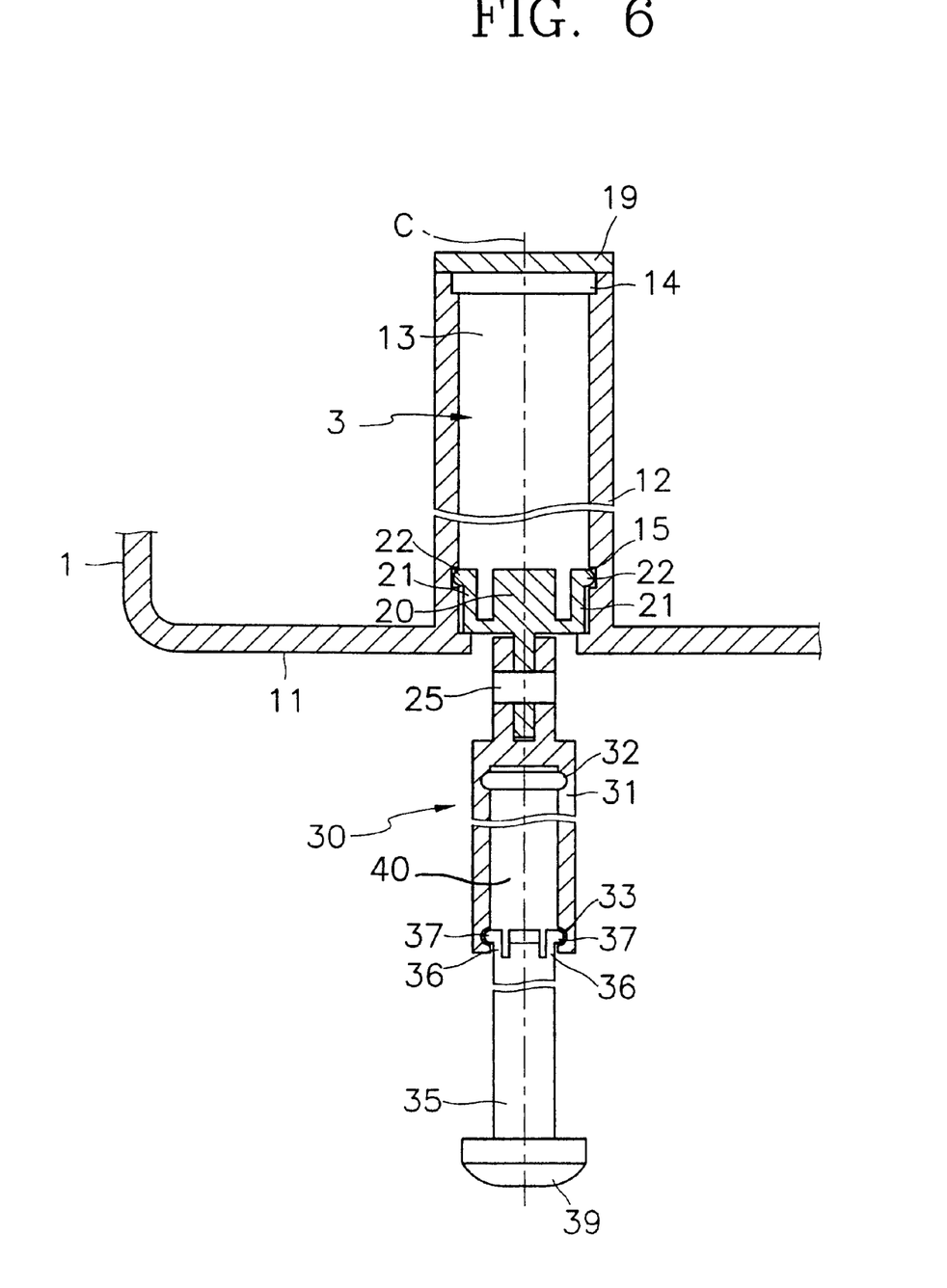
FIG. 6 is a sectional view showing a state in which a support body shown in FIG. 5 is rotated.

The leg 30 can move from a retracted or inserted position inside first cavity 13 of photographic apparatus 1, as shown in FIG. 3, to a protruded or extended position shown in FIG. 5 by extending leg 30 away from the bottom surface 11 of the photographing apparatus 1. Reversely, the leg 30 can move from the extended or protruded position of FIG. 5 to the inserted or retracted position of FIG. 3 by being inserted into the first cavity 13 of photographic apparatus 1. The support body 20, which always remains within first cavity 13, can rotate 360° around a center axis C. FIG. 6 shows a state in which the support body 20 is rotated 90° from the position shown in FIG. 5.

First cavity 13 has hooking grooves 14 located deep within first cavity 13 and adjacent to cap 19. First cavity 13 also has hooking grooves 15 located near an entrance to first cavity 13, hooking grooves 15 being located a substantial distance from cap 19 and hooking grooves 14. First cavity 13 can have stored within it both second leg member 35 and first leg member 31 provided that second leg member 35 is stored within second cavity 40 of first leg member 31 when leg 30 is retracted or inserted inside of first cavity 13 of photographic apparatus 1.

The leg 30 is made up of a first leg member 31 and a second leg member 35 accommodated in the first leg member 31. An upper end portion of the leg 30, that is, an upper end portion of the first leg member 31, is hinge-coupled by the support body 20 by a coupling pin 25. As illustrated in FIG. 5, coupling pin 25 is disposed between stopper 20 and first leg member 31 of leg 30. As illustrated in FIG. 5, when leg assembly 3 is fully extended or protruded from photographic apparatus 1, stopper 20 remains just inside first cavity 13 of photographic apparatus 1 while coupling pin 25 is located just outside first cavity 13 of photographic apparatus 1, and first leg member 31, second leg member 35 and contact portion 39 are disposed outside and away from first cavity 13 and bottom surface 11 of photographic apparatus 1, allowing leg 30 made up of first leg member 31, second leg member 35 and stopper 39 to rotate freely about coupling pin 25 external from first cavity 13 of photographic apparatus 1 while stopper 20 remains locked just inside first cavity 13 of photographic apparatus 1, preventing leg assembly 3 from being separated from photographic apparatus 1. A contact portion 39, capable of contacting a support surface S (see FIG. 7) for supporting the photographing apparatus 1, is fixed to a lower end portion of the leg 30, that is, a lower end portion of the second leg member 35. The contact portion 39 is preferably formed of a rubber material to prevent slippage on the support surface S, even when the support surface S is slippery. The second leg member 35 can move within second cavity 40 inside first leg member 31 from the retracted or inserted position of FIG. 3 to the extended or protruded position of FIG. 5 by moving second leg member 35 with respect to the first leg member 31. Reversely, the second leg member 35 can move from the extended or protruded position of FIG. 5 to the retracted or inserted position of FIG. 3 by inserting second leg member 35 into the second cavity 40 of the first leg member 31.

The support device of the present embodiment is provided with a first leg member locking means and a second leg member locking means. The first leg member locking means is for preventing inadvertent extension of the first leg member 31 when first leg member 31 is fully inserted or retracted into first cavity 13 in the photographing apparatus 1. The first leg member locking means also prevents inadvertent insertion or retraction of the first leg member 31 into first cavity 13 when first leg member 31 is fully extended or protruded from the photographing apparatus 1. The first leg member locking means is made up of a plurality of elastic pieces 21 formed at the support body 20 to be elastically deformed and having hooking protrusions 22 at free end portions thereof, and a pair of hooking grooves 14 and 15 formed inside first cavity 13 in the inner circumferential surface of boss 12 of the photographing apparatus 1. The hooking protrusions 22 are hooked by the upper hooking groove 14 when the first leg member 31 is in an inserted or retracted state, as shown in FIG. 3. 1 looking protrusions 22 are hooked onto lower hooking groove 15 when the first leg member 31 is in an extended or protruded state as shown in FIG. 5. The hooking grooves 14 and 15 are formed to have a ring shape along the entire inner circumferential surface of first cavity 13 of the boss 12 of the photographing apparatus 1 so that the support body 20, in a state of being hooked by the hooking grooves 14 and 15, can rotate.

The second leg member locking means is for preventing inadvertent extension or protrusion of the second leg member 35 when the second leg member 35 is inserted or retracted into second cavity 40 in the first leg member 31. The second leg member locking means also prevents inadvertent insertion or retraction of the second leg member 35 into second cavity 40 when second leg member 35 fully extends pr protrudes from the first leg member 31. The second leg member locking means is made up of a plurality of elastic pieces 36 located at a top end of second leg member 35. Elastic pieces 36 are elastically deformed and have hooking protrusions 37 at free end portions of elastic pieces 36. A pair of hooking grooves 32 and 33 are located inside second cavity 40 of first leg member 31. The hooking protrusions 37 can become hooked to upper hooking groove 32 found deep inside second cavity 40 when the second leg member 35 is inserted (i.e. retracted) into first leg member 31, as shown in FIG. 3. Lower hooking groove 33, located just inside second cavity 40 near the entrance to second cavity 40 and being a substantial distance from hooking groove 32 accommodates hooking protrusions 37 when the second leg member 35 is fully extended or protruded from the first leg member 31, as shown in FIG. 5.

Reference numeral 17 denotes a stopper for preventing the removal of support body 20 from first cavity 13 of the photographing apparatus 1. Reference numeral 19 denotes a cover fixed to a top surface of the first cavity 13 of the boss 12, attached by ultrasonic welding or screw coupling, to prevent the support body 20 from further retraction or insertion into photographic apparatus 1 beyond cover 19 of first cavity 134.

In the operation of the support device 20 of a photographing apparatus 1 according to the present invention having the above structure, when carrying the photographing apparatus 1 or taking pictures, a user inserts (i.e., retracts) the leg assembly 3 into the photographing apparatus 1 having bottom surface 11 as shown in FIG. 3. In this state, as the hooking protrusions 22 are hooked by the hooking groove 14 deep inside first cavity 13 and the hooking protrusions 37 are hooked onto hooking groove 32 deep inside second cavity 40. In this situation, the first leg member 31 is prevented from protruding or extending from the bottom surface 11 of the photographing apparatus 1, and the second leg member 35 is prevented from protruding or extending from the first leg member 31 when an inadvertent or small force is applied to contact portion 39.

When the photographing apparatus 1 is placed on a certain support surface to take pictures, the contact portion 39 of the leg assembly 3 in the retracted or inserted state shown in FIG. 3, is pulled via contact portion 39 from the bottom surface 11 of the photographing apparatus 1. When contact portion 39 of leg assembly 3 is pulled, a force is applied by hooking groove on hooking protrusions 22. The elastic pieces 21 are then elastically deformed and bend as the hooking protrusions 22 dislodge, via camming action, from the hooking groove 14 located deep within first cavity 13. Simultaneously, the support body 20, along with elastic pieces 21 and hooking protrusions 22 are moved towards the opening of first cavity 13, allowing hooking protrusions 22 to engage with hooking groove 15 just inside the entrance of first cavity 13, thus keeping support body 20 near the entrance of first cavity 13 but still within first cavity 13 of photographic apparatus 1. A force is also applied to hooking protrusions 37 by hooking groove 32, causing hooking protrusions 37 of second leg member 35 to dislodge from hooking protrusion 37 and to slide down, away from photographic apparatus 1, only to engage with hooking groove 33 found at the entrance of second cavity 40 within first leg member 31. Thus, the elastic pieces 36 are elastically deformed and the hooking protrusions 37 dislodge from the hooking groove 32 by camming action. Simultaneously, the second leg member 35 extends or protrudes from a distal end first leg member 31 by an external force applied via the contact portion 39. In a state in which the support body 20 is located near, but inside, the entrance of first cavity 13 as illustrated in FIG. 5, the hooking protrusions 22 are hooked by the lower hooking groove 15 located within first cavity 13 near the entrance of first cavity 13 by a restoring force of the elastically deformed elastic pieces 21, and are caught at that position, as shown in FIG. 5. Also, in a state in which the second leg member 31 protrudes or extends from second cavity 40 of first leg member 31, the hooking protrusions 37 are hooked by the hooking groove 33 by a restoring force of the elastically deformed elastic pieces 36, and are caught at that position, as shown in FIG. 5.

Figure 7:
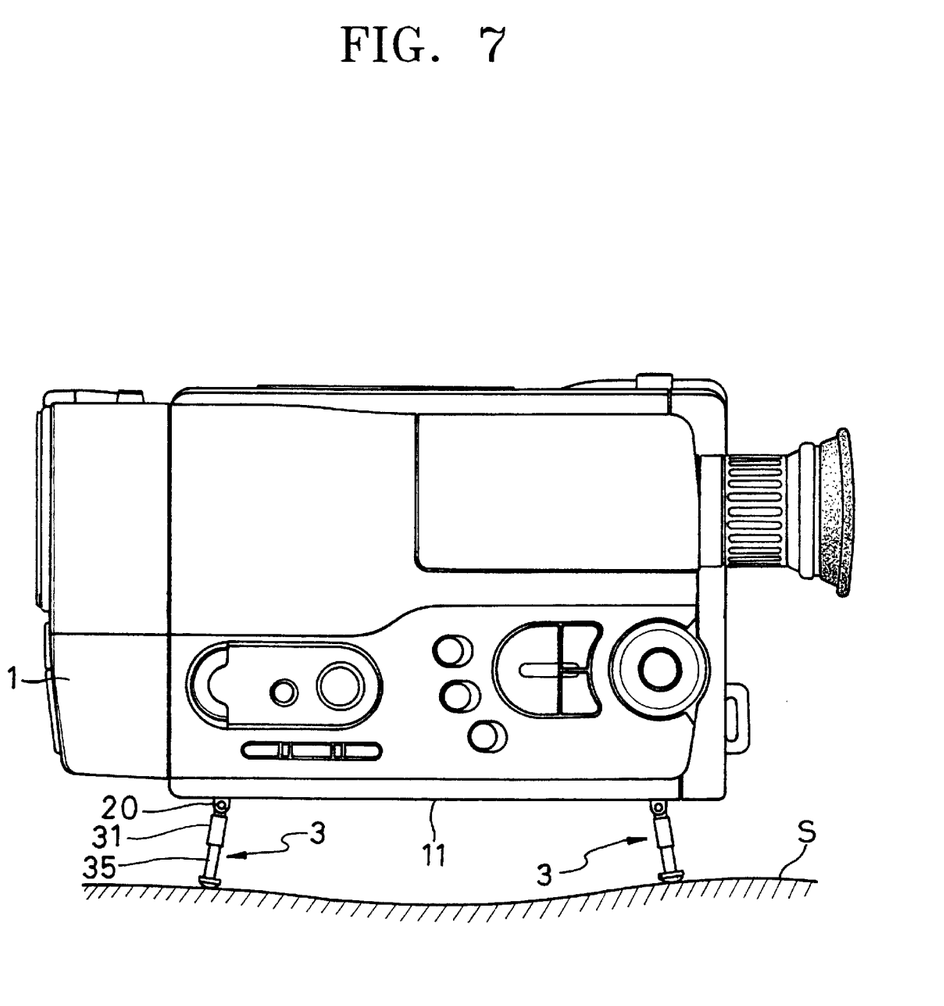
FIG. 7 is a sectional view showing a state in which a photographing apparatus is supported on an uneven support surface by the support device shown in FIG. 1.

When the three leg assemblies 3 are all protruding from the photographing apparatus 1 as above, each leg 30 is rotated with respect to the support body 20 to be inclined appropriately with respect to the bottom surface 11 of the photographing apparatus 1, as shown by an imaginary line of FIG. 5, considering the shape and degree of inclination or unevenness of a support surface S (see FIG. 7). The support body 20 is rotated an appropriate angle around the center axis C of the support body 20, allowing each leg 30 to incline with respect to bottom surface 11 of photographing apparatus 1 at any angle of choice. Accordingly, the leg 30 coupled to the support body 20 is rotated together so that the inclination of the leg 30 is adjusted in any direction.

The photographing apparatus 1 is placed on the support surface S by rotating three legs 30 an appropriate angle and in an appropriate direction and allowing the contact portions 39 of the respective legs 30 to contact the support surface S. By appropriately adjusting the inclination and direction of each leg 30, for example, when the support surface S where the photographing apparatus 1 is placed is inclined or uneven, as shown in FIG. 7, the photographing apparatus 1 can be supported on the support surface S at a desired posture.

When the legs 30 are to be included in the photographing apparatus 1 in a state in which the photographing apparatus 1 is supported on the support surface S by the support device of the present embodiment, the contact portion 39 is pressed to insert the leg assembly 3 into the photographing apparatus 1. Here, contrary to the above leg extension or protrusion process, the hooking protrusions 22 and the hooking protrusions 37 escape from the hooking groove 15 and the hooking groove 33, respectively, and simultaneously, as shown in FIG. 3, the support body 20 and the first leg member 31 coupled to the support body 20 are inserted into first cavity 13 of the photographing apparatus 1 and the second leg member 35 is inserted inside second cavity 40 of the first leg member 31. Then, as the hooking protrusions 22 and 37 are hooked by the hooking grooves 14 and 32, respectively, the support body 20 and the second leg member 35 and the first leg member 31 are prevented from protruding or extending out of photographing apparatus 1.

When the support device of a photographing apparatus according to the preferred embodiment of the present invention is adopted, the photographing apparatus 1 can be supported on the support surface S at a desired posture by pulling the legs 30 included in the photographing apparatus 1 to be protruding therefrom and appropriately adjusting the inclination and direction of the legs 30, without a separate tripod. Thus, the photographing apparatus 1 can be easily and quickly supported on the support surface S to take pictures and also carrying the photographing apparatus 1 can be made be convenient. Also, as the support device is incorporated in the photographing apparatus 1, there is no possibility of losing the support device so that the photographing apparatus 1 can be placed on any support surface at a desired posture to take pictures, as necessary.

In the present preferred embodiment, although each leg 30 includes the first leg member 31 hinge-coupled to the support body 20 and the second leg member 35 having the contact portion 39 and the second leg member 35 is configured to be moved in directions in which the second leg member 35 is inserted into or extends from second cavity 40 of the first leg member 31, the structure of the leg of the support device of the present photographing apparatus is not limited thereto. For example, by omitting the second leg member 35, a leg in which the contact portion 39 is directly fixed to a lower portion of the first leg member 31 can be adopted, wherein the other end of first leg member 31 is attached to coupling pin 25 which is attached to support device 20.

Also, in the present preferred embodiment, although the position of the support body 20 is fixed by the hooking protrusions 22 and the hooking grooves 14 and 15, instead of providing the hooking protrusions 22 and the hooking grooves 14 and 15, the outer diameter of the support body 20 and the inner diameter of the boss 12 of the photographing apparatus 1 are designed such that a relatively greater frictional force is generated between the outer circumferential surface of the support body 20 and the inner circumferential surface of the boss 12 surrounding first cavity 13, to prevent the support body 20 from inadvertently moving. Likewise, instead of the hooking protrusion 37 and the hooking grooves 32 and 33 to prevent the second leg member 32 from moving within second cavity 40 within the first leg member 31, arbitrary movement of the second leg member 35 is prevented by using a frictional force between the inner circumferential surface of second cavity 40 of the first leg member 31 and the outer circumferential surface of the second leg member 35.

As described above, in the support device of a photographing apparatus according to the present invention without providing a separate tripod, the photographing apparatus can be supported on a support surface at a desired posture by legs included to be capable of protruding from the photographing apparatus. Thus, the photographing apparatus can be easily and quickly supported on the support surface to take pictures and carrying the photographing apparatus becomes convenient. Also, there is no possibility of losing the support device and taking pictures can be performed, as necessary, in a state in which the photographing apparatus is supported on a support surface at a desired posture.

What is claimed is:

1. A support device of a portable photographing apparatus for supporting the portable photographing apparatus on an arbitrary support surface, the support device comprising:

a plurality of support bodies coupled to the photographing apparatus to be capable of moving within respective ones of a plurality of first cavities so that each one of said plurality of support bodies is located deep within respective ones of said plurality of cavities during insertion and so that each one of said plurality of support bodies is located at an entrance of respective ones of said plurality of first cavities and being near a bottom surface of said portable photographic apparatus during extension, said support bodies being still within respective ones of said plurality of first cavities during extension; and a plurality of legs having contact portions contacting the support surface at lower end portions thereof and having upper end portions hinge-coupled to the plurality of support bodies to be moved together with the plurality of support bodies, said plurality of legs extending from the bottom surface of the photographing apparatus during extension, said plurality of legs being capable of being inclined with respect to the bottom surface of the photographing apparatus.

2. The device as claimed in claim 1, wherein each of said plurality of legs comprises a hollow first leg member hinge-coupled to the support body and a second leg member to be capable of protruding from and being inserted into the first leg member and having the contact portion.

3. The device as claimed in claim 2, further comprising a second leg member locking device for preventing the second leg member in said states of extension and insertion from arbitrarily being inserted or extended, respectively with respect to the first leg member.

4. The device as claimed in claim 1, wherein each one of said plurality of support bodies is supported to be capable of rotating with respect to the photographing apparatus around a center axis of respective ones of said plurality of support bodies.

5. The device as claimed in claim 1, further comprising a support locking device for preventing the support body during extension and insertion with respect to the bottom surface of the photographing apparatus from arbitrarily being inserted or extended, respectively with respect to the bottom surface of the photographing apparatus.

6. The device as claimed in claim 1, wherein the contact portion is formed of a rubber material to prevent slippage with respect to the support surface.

7. The device of claim 3, said second member locking device comprising:
   a hooking groove formed within a base of said first leg member; and
   a hooking protrusion formed on ends of elastic pieces at a top of said second leg member, said hooking protrusion cams and locks into said hooking groove.

8. The device of claim 7, said hooking groove and said hooking protrusion are annular and said hooking groove is formed inside a second cavity inside of said first leg member.

9. A method for supporting a photographing device on a surface, comprising the steps of:
   turning over said photographing device exposing a bottom side thereof;
   pulling at each of a plurality of leg assemblies originally stored away within cavities of said photographing device;
   extending said leg assemblies by pulling a bottom of each of said plurality of leg assemblies away from a photographing device body;
   turning back over said photographing device so that said bottom side faces said surface; and
   placing said photographing device on said surface by having said bottom of each of said plurality of leg assemblies come in contact with said surface.

10. The method of claim 9, further comprising the step of inclining each one of said plurality of leg assemblies to form an acute angle with said bottom surface of said photographing device to allow said bottoms of said plurality of leg assemblies to match a contour of said surface.

11. The method of claim 10, said step of extending said leg assemblies comprises the steps of:
   extending a second leg member from within a first leg member; and
   extending said first leg member from within said cavity in said bottom of said photographing device.

12. A photographing apparatus for placement on a surface, comprising:
   a plurality of cavities in a bottom side of said photographic apparatus; and
   a plurality of collapsible legs, each one stored in a corresponding one of said cavities on said bottom side of said photographic apparatus.

13. The apparatus of claim 12, each one of said plurality of legs comprises a coupling pin allowing each one of said plurality of legs to pivot and incline with respect to said bottom side of said photographic apparatus only when each one of said plurality of legs are fully extended from said bottom side of said photographic apparatus.

14. The apparatus of claim 13, each one of said plurality of legs comprises:
   a support body preventing said one of said plurality of legs from being removed from said one of said cavities;
   a first leg member connected to said support body and protruding from said photographic apparatus upon extension of each one of said plurality of legs; and
   a second leg member connected to said first leg member and further protruding from said photographic apparatus upon said extension of each one of said plurality of legs, said coupling pin being located where said first leg member attaches to said support body.

15. The apparatus of claim 14, wherein said support body always remains within said cavity regardless of whether or not said one of said plurality of legs is fully extended.

16. The apparatus of claim 15, a proximal end of said first leg is connected to said support body via said coupling pin while a distal end of said first leg member is connected to a proximal end of said second leg member.

17. The apparatus of claim 16, said second leg member fits inside said first leg member and said first leg member fits inside said cavity along with said support body when said one of said plurality of legs is collapsed and inserted to fit within said photographic apparatus.

18. The apparatus of claim 17, a distal end of said second leg member comprises a rubber contact portion to form a secure contact with said support surface.

19. The apparatus of claim 18, said support body is locked within said cavity of said photographic apparatus both when said leg is fully extended and when said leg is fully inserted within said body of said photographic apparatus, said locking being caused by annular hooking grooves within said cavity and annular hooking protrusions at a distal end of elastic pieces of said support body interacting with said annular hooking grooves within each one of said cavities of said photographic apparatus.

20. The apparatus of claim 19, said second leg member locks to said first leg member both when said second leg member is fully extended from said first leg member and when said second leg member is fully inserted within said first leg member, said locking being caused by annular hooking grooves within a cavity of said first leg member, one annular groove at said proximal end of said first leg member and the other annular groove at said distal end of said first leg member and annular hooking protrusions at a distal end of elastic pieces at said proximal end of said second leg member interacting with said annular hooking grooves within said cavity of said first leg member.

21. A photographing device having a body and a bottom side, said bottom side having a plurality of first cavities that extend into said photographic device, each of said plurality of first cavities having a leg assembly capable of moving between an extended position and a retracted position via user manipulation, said leg assembly comprising:
   a support body permanently located within one of said plurality of first cavities allowing rotation of said leg assembly;

a coupling pin connected to said support body;

a first leg member having a distal end and a proximal end, said proximal end of said first leg member being attached to said coupling pin, said distal end of said first leg member being at opposite ends of said coupling pin from said support body, said first leg member being essentially hollow and comprising a second cavity;

a second leg member having a distal end and a proximal end, said proximal end being attached to said first leg member, said proximal end of said second leg member being located within said second cavity of said first leg member; and a contact portion attached to said distal end of said second leg member, said coupling pin allowing for inclination of said first leg member, said second leg member, and said contact portion with respect to said bottom surface of said photographing apparatus only when said leg assembly is in said extended position.

22. The device of claim 21, wherein when said leg assembly is in said retracted position, said coupling pin, said first leg member, and said second leg member being located within said one of said plurality of said first cavities, said proximal end of said second leg member being located deep within said second cavity, said support device being located deep inside said one of said plurality of first cavities.

23. The device of claim 21, wherein when said leg assembly is in said extended position, said support device being located at an opening of said one of said plurality of first cavities, said coupling pin, said first leg member, said second leg member and said contact portion being located outside one of said plurality of first cavities and outside said photographing device body, said proximal end of said second leg member being located just inside an opening of said second cavity and being attached to said distal end of said first leg member, said distal end of said second leg member and said contacting portion being located outside said second cavity, said support device being located just inside an opening of said one of said plurality of said first cavities.

24. The device of claim 22, wherein one of said plurality of said first cavities of said photographing device having a pair of annular hooking grooves embedded in sidewalls of said one of said plurality of said first cavities for preventing inadvertent movement of said first leg member, said support body having annular hooking protrusions that can engage with either one of said pair of annular hooking grooves located in said one of said plurality of said first cavities one of said pair of annular hooking grooves being located deep within said one of said plurality of said first cavities and the other of said pair of annular hooking grooves being located near said opening of said one of said plurality of said first cavities.

25. The device of claim 24, wherein said second cavity of said first leg member having a pair of annular hooking grooves embedded in sidewalls of said second cavity for preventing inadvertent movement of said second leg member, said second leg member having an annular hooking protrusion at said proximal end that can engage either one of said pair of annular hooking grooves of said first leg member.

26. The device of claim 25, when said leg assembly is in said retracted position, said hooking protrusion of said support body is engaged with said annular hooking groove deep within said one of said plurality of said first cavities and said hooking protrusion of said second leg member is engaged with said annular hooking groove deep within said second cavity.

27. The device of claim 25, when said leg assembly is in said extended position, said annular hooking protrusion of said support body is engaged with said annular hooking groove near said opening of said one of said plurality of said first cavities and said annular hooking protrusion of said second leg member is engaged with said annular hooking groove near said opening of said second cavity.

28. The device of claim 26, wherein when said leg assembly is in said retracted position and a user pulls on said contact portion, said annular hooking protrusion of said support body disengages from said annular hooking groove deep within said one of said plurality of first cavities via camming action and said annular hooking protrusion of said second leg member disengages with said annular hooking groove deep within said second cavity via camming action.

29. The device of claim 27, wherein when said leg assembly is in said extended position and a user pushes on said contact portion, said annular hooking protrusion of said support body disengages from said annular hooking groove near said opening of said one of said plurality of first cavities via camming action and said annular hooking protrusion of said second leg member disengages with said annular hooking groove near said opening of said second cavity via camming action.

30. The device of claim 21, further comprising a stopper at said opening of said one of said plurality of said first cavities preventing the removal of said support body from said one of said plurality of said first cavities.

31. A method for supporting a photographing device on an uneven surface, said method comprising the steps of:

turning over said photographing device exposing a bottom side thereof;

pulling at each of a plurality of contact portions of leg assemblies originally retracted within cavities of said photographing device;

extending each first leg member so that a proximal end of each first leg member moves from deep within a first cavity to near an opening of each first cavity simultaneously to extending each second leg member so that a proximal end of each second member moves from deep within a second cavity of each respective first leg member to near an opening of each second cavity, exposing each coupling pin;

pivoting or rotating each leg assembly so that each coupling pin respectively is oriented in a predetermined direction;

inclining each leg assembly relative to a bottom of said photographing device to form a predetermined angle between respective leg assemblies and said bottom of said photographing device;

turning back over said photographing device so that said bottom side faces said surface; and placing said photographing device on said surface by having said bottom of each of said plurality of leg assemblies come in contact with said surface.

32. The method of claim 31, wherein each first and second cavities have a pair of annular grooves located at opposite ends of the respective cavities, said annular grooves being embedded in sidewalls of each respective cavity, a support body and said second leg members each having annular hooking protrusions that engage with said annular grooves and disengage from said annular grooves by camming action.

* * * * *